June 20, 1967     A. E. MITCHELL     3,326,227

PULSE POWERED FLUID DEVICE WITH FLOW ASYMMETRY CONTROL

Filed Dec. 21, 1964     6 Sheets-Sheet 1

INVENTOR
ALLAN E. MITCHELL

BY *Robert C. Sandt*

AGENT

FIG. 6
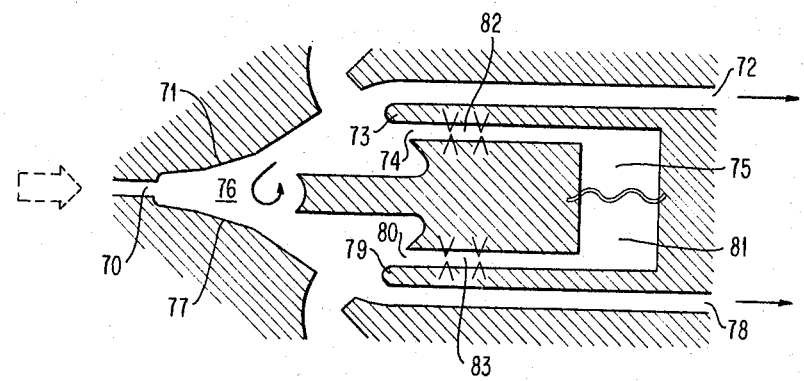
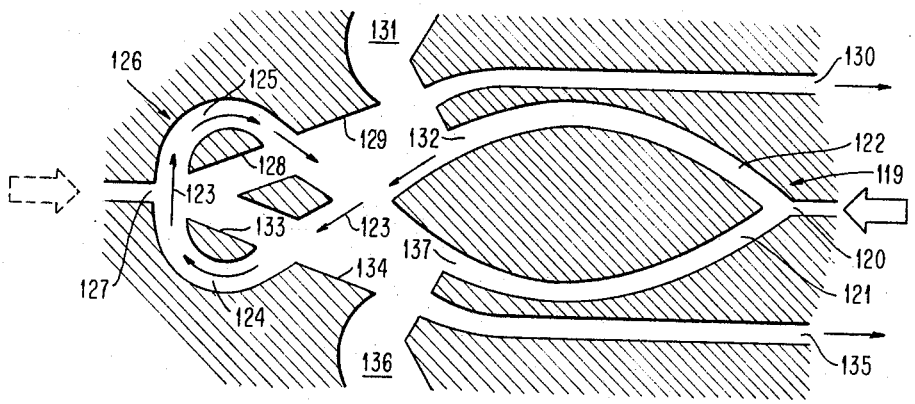
FIG. 8

June 20, 1967  A. E. MITCHELL  3,326,227
PULSE POWERED FLUID DEVICE WITH FLOW ASYMMETRY CONTROL
Filed Dec. 21, 1964  6 Sheets-Sheet 6

United States Patent Office 3,326,227
Patented June 20, 1967

3,326,227
PULSE POWERED FLUID DEVICE WITH FLOW ASYMMETRY CONTROL
Allan E. Mitchell, Winchester, England, assignor to International Business Machines Corporation, Armonk, N.Y., a corporation of New York
Filed Dec. 21, 1964, Ser. No. 419,985
Claims priority, application Switzerland, Jan. 7, 1964, 113/64
4 Claims. (Cl. 137—81.5)

ABSTRACT OF THE DISCLOSURE

A fluid amplifier having a vortex chamber into which the power jet flows intermittently and control jets disposed off axis facing the power jet to establish a vortex flow during the non-flow of the power jet to deflect the power jet into one of two outlet ducts disposed outboard of the control ducts, the control jets being ineffective to divert the power jet during its flow, yields high gain with pressure in the control ducts being independent of the power jet position. The pressure independence is enhanced by cross-ducting the control ducts and venting them to the outlet ducts.

---

This invention relates to fluid jet amplifiers and more particularly to improvements therein for inducing a selectively directional vortex action to cause selective bistable operation.

In the fluid devices of the prior art having a main flow and one or more control flows, the control channels have always been arranged next to the outlet of the main jet in order to control the direction into which the main jet was to be deflected. This arrangement has proved unsatisfactory in that with each switching of the jet from one state to the other, a change in pressure in the control lines occurred. Also, it has so far not been possible to control the pressure in the control channels when no control flow is present. Finally, with the control channels arranged at the exit of the nozzle of the main jet, the fluid devices of the prior art could have only limited gain because a finite amount of pressure was necessary to deflect the main jet from one stable position to the other.

It is therefore an object of the present invention to overcome these disadvantages and to describe a fluid element in which the control channels can be removed from their conventional position to a more advantageous location.

It is a further object of this invention to provide a fluid element in which the control channels are no longer subject to pressure changes during the operation of the element.

Still another object of this invention is to provide a fluid element in which the gain can be made nearly infinite.

A final and specific object is to provide a controlled fluid device having a pulsed main jet, which jet is able to assume at least one stable position, and with at least one control channel for the deflection of the main jet by flow asymmetry, wherein the control nozzle is arranged at a distance from the main nozzle in the direction of the main jet, and that the direction of flow of the respective control flow is opposite to the direction of flow of the man jet, so that a flow asymmetry (vortex) can be established within the interaction chamber of the element.

Figure 1:
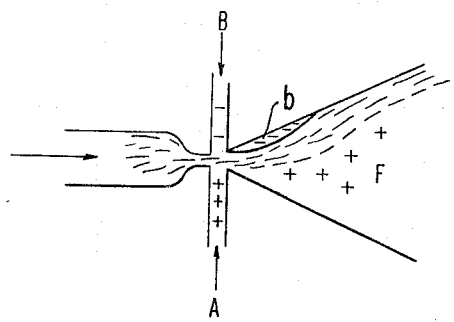
Figure 4A:
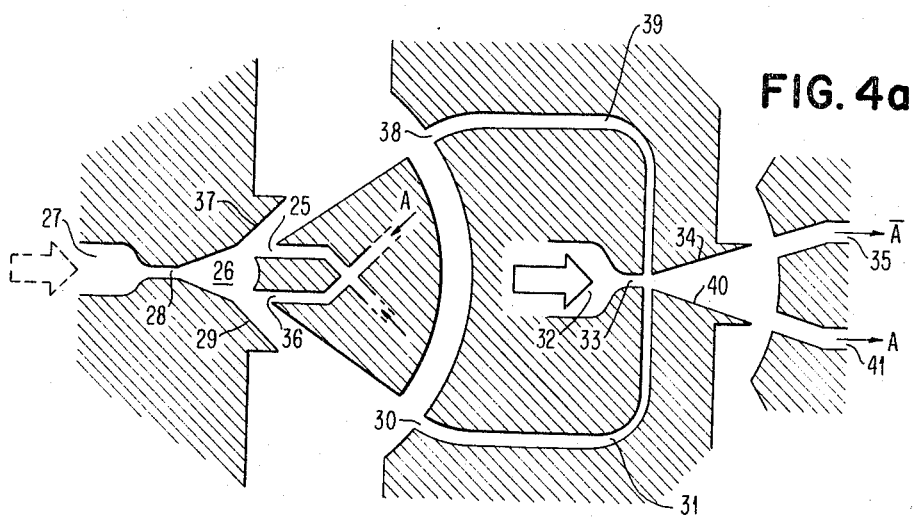
Figure 4B:
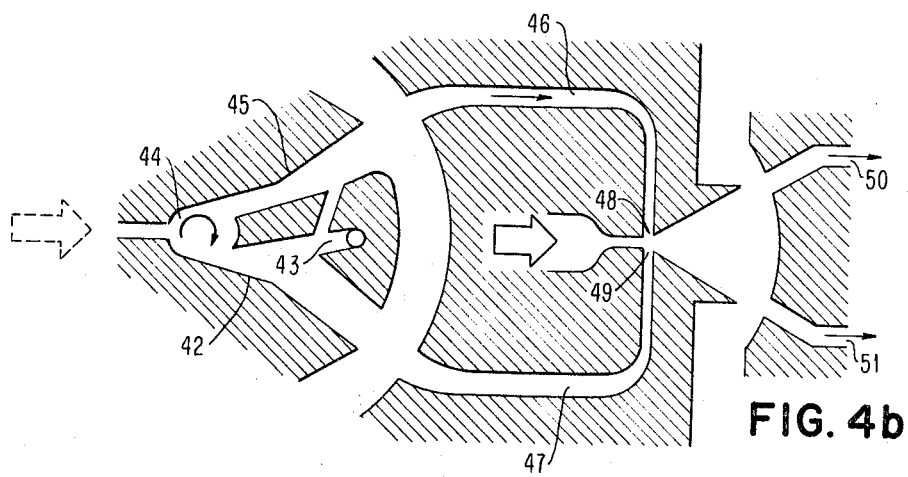
Figure 2:
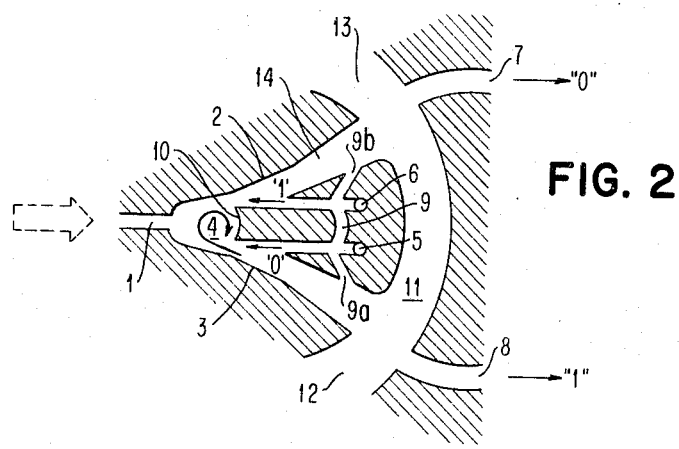
Figure 3:
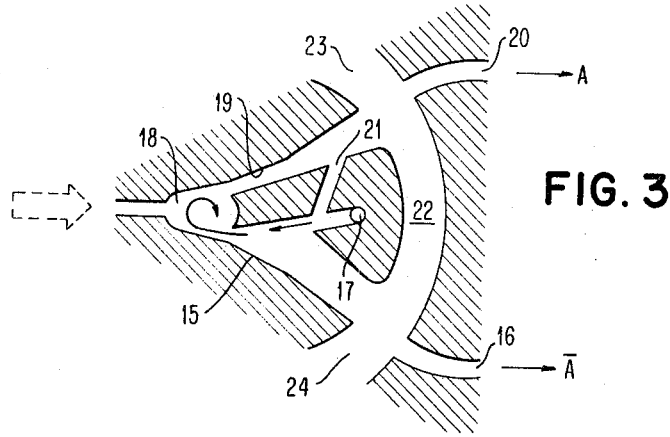
Figure 5:
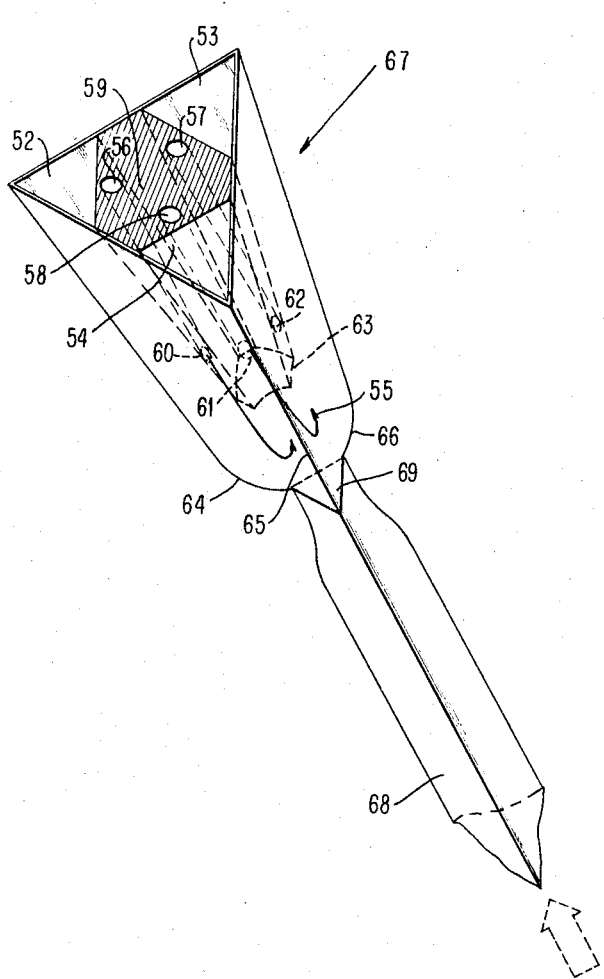
Figure 7A:
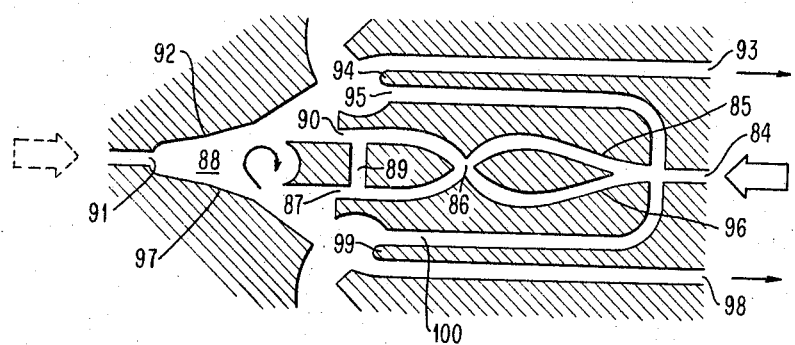
Figure 7B:
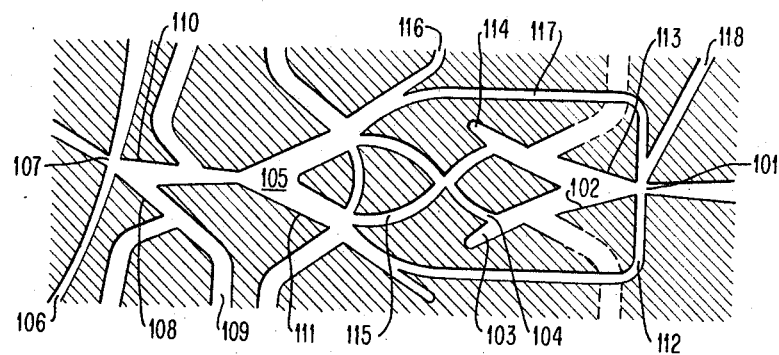
Figure 9A:
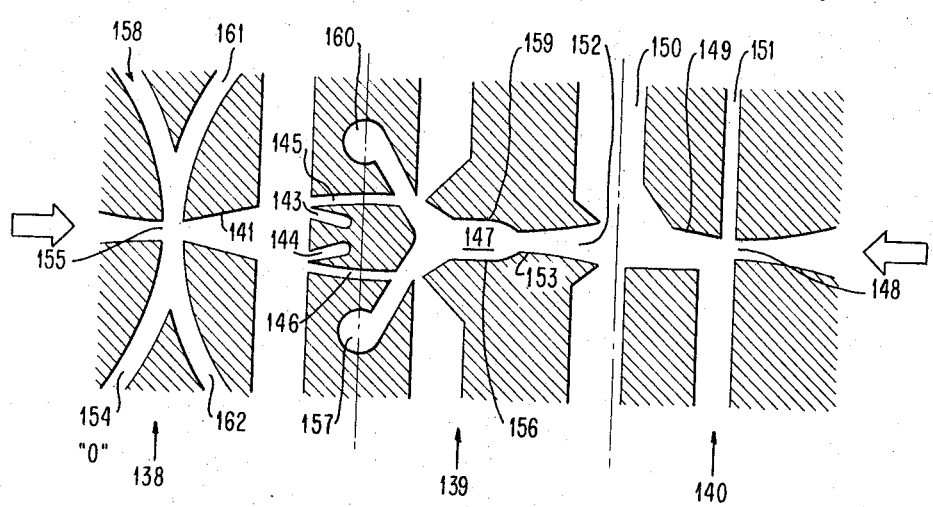
Figure 9B:
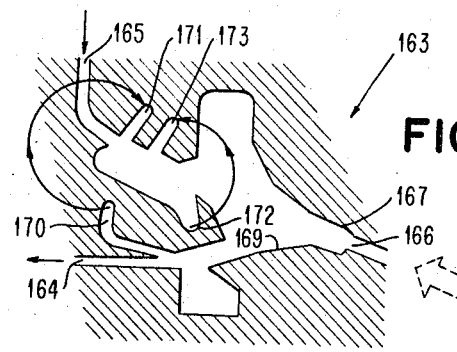

The foregoing and other objects, features and advantages of the invention will be apparent from the following more particular description of preferred embodiments of the invention as illustrated in the accompanying drawings wherein:

FIG. 1 shows a conventional bistable fluid amplifier,
FIG. 2 shows a pulse powered bistable fluid amplifier with flow asymmetry control,
FIG. 3 shows a pulse powered monostable fluid amplifier with shape asymmetry,
FIGS. 4a and 4b show the pulse powered fluid amplifiers of FIGS. 2 and 3 in combination with conventional bistable fluid amplifiers,
FIG. 5 shows a tristable fluid amplifier with flow asymmetry control,
FIG. 6 shows a flip-flop operated pulse powered fluid amplifier with internal flow asymmetry control,
FIGS. 7a and 7b show examples of pulse powered fluid binary counter stages with flow asymmetry control,
FIG. 8 shows a pulse powered fluid amplifier with flip-flop asymmetry control, and
FIGS. 9a and 9b show examples of fluid shift register stages.

It is known to those skilled in the art that a power jet emanating from a nozzle tends to attach to a boundary wall of a fluid device of the type shown in FIG. 1 when a control flow is present in one of the control channels, and that it can be switched to attach to the other boundary wall when the supply of fluid is stopped in the first control channel and applied to the other control channel. The attachment of the jet to one of the walls is caused by a pressure gradient across the area into which the jet exhausts from the nozzle. For example, if a control flow is entered through channel A, a region of high pressure is formed in the lower part of the area designated F. Likewise, a region of low pressure is established in the form of a bubble at the upper boundary wall. It can be said that the suction thus created causes the jet to attach to the upper wall. While there is high pressure in control channel A and in the lower part of the area F, there is low pressure in the bubble b and in control channel B, resulting in a considerable pressure difference in the two control channels.

When there is a control flow in channel B and no control flow in channel A, the jet will be forced to attach to the lower wall, thus setting up high pressure in channel B and in the upper part of the area F, while there will be low pressure in channel A and in the adjacent bubble b. There is therefore a great change in the pressure in the control channels, depending on the position of the jet. This is a very undesirable feature of the fluid amplifier of the prior art, in that one has to take the changes in pressure into account by providing biasing resistances, or the like, which make the control circuitry very complicated.

According to the present invention these disadvantages can be overcome by a fluid element in which a flow asymmetry is present in the interaction chamber. The establishment of this flow asymmetry will be described in greater detail in the following description.

FIG. 2 shows a fluid element in the form of a bistable fluid amplifier which is operated from a pulsed power jet. The jet emanating from a nozzle 1 is able to assume either of two stable states by attaching either to a wall 2 or to a wall 3. Which of the two stable states it assumes depends on the flow asymmetry present in an interaction chamber 4. This asymmetry is caused by injection of flow through one of the control channels 5 or 6. It may be assumed that control channel 5 represents the "0" state, while control channel 6 represent the "1" state. When no jet pulse is present at nozzle 1, and a control flow is injected for instance through control channel 5, a gentle vortex in a clockwise direction is created in interaction chamber 4. The jet pulse arriving at nozzle 1 detects this vortex and is deflected to attach to upper wall 2 and enter into a receiver 7 representing the "0" state of the jet.

During the presence of the jet pulse, the control flow may be taken off control channel 5 and applied to control channel 6 without effect on the main jet which remains attached to wall 2. Not until the jet pulse ceases does the control flow through control channel 6 establish a vortex in a counterclockwise direction in interaction chamber 4. The next jet pulse will detect this vortex and be deflected to attach to wall 3 and enter into a receiver 8 representing the "1" state of the jet.

The control signals used to control the jet are very gentle steady flows. A connector 9 is provided between the two control channels 5 and 6 in order to maintain the same pressure on both channels. Because only a very gentle flow from the control channels is necessary to create the vortex in interaction chamber 4, it is possible to achieve a very high gain with this fluid amplifier.

A cusp or curved region 10 in front of the control channels serves to enhance the bistability of the device, to shorten it, and to shield the control channels from the pulsed jet. A curved area 11 behind the control channels passing between flow sinks 12 and 13 allows the element to be operated with high load on output receivers 7 and 8.

Connector 9 and channels 9a and 9b help to prevent changes in pressure level in the control channels, since it is undesirable that the pressure level be affected by the position that the jet takes. If it is assumed that the jet is in its upper position entering receiver 7, some of the fluid present in channel 6 may be sucked out into a duct 14, thus causing a difference in the pressures present in channels 5 and 6.

While FIG. 2 shows a physically symmetrical arrangement which is bistable, in that the jet can take two stable positions, and in which the asymmetry is caused only by the presence of one or the other of the control flows, FIG. 3 shows a physically asymmetrical element in which the position of the jet is determined by the presence or absence of a single control flow. This element is monostable in that when no control flow is present, the jet will attach to a lower wall 15 and exhaust through an outlet 16 representing the non-presence of the control flow. If a control flow is applied to a control channel 17, a vortex in a clockwise direction is set up in an interaction chamber 18. The jet pulse detecting the vortex will be deflected to attach to an upper wall 19 and emanate through an outlet 20, which thus represents the presence of the control flow. A compensation duct 21, a circular channel 22, and sinks 23 and 24 are provided to hold the pressure in control channel 17 constant and to replace the fluid which might have been sucked out of the control channel by the jet.

The operation of the device is as follows:

When the gentle control flow from channel 17 is not present, all jet pulses reattach to the lower wall 15 because of the shape asymmetry of this element. However, the gentle control flow is sufficient to overcome the effect of the shape asymmetry and causes a flow asymmetry towards the upper wall. Therefore, when the control flow is present, the pulses reattach to the upper wall. When the supply of control fluid in channel 17 is stopped, the vortex in interaction chamber 18 ceases to exist and the jet pulses again attach to the lower wall 15.

The difference between the elements described above, and shown in FIGS. 2 and 3, is the following; the element of FIG. 2 is a purely symmetrical element in which a flow asymmetry is established when one of two possible control flows is present; the element of FIG. 3 is per se asymmetrical, so that the jet pulses always assume a predetermined or preferred direction; it is therefore only necessary to have a single control flow to switch the jet from one position to the other; that is, this fluid element is monostable.

FIG. 4a shows a high gain fluid amplifier which is composed of the elements of FIG. 2 or FIG. 3 and a conventionally controlled bistable fluid amplifier. A gentle steady flow is applied to a control channel 25 to create a vortex in a counterclockwise direction in an interaction chamber 26. The pulsed jet entering an input 27 and emanating from a nozzle 28 is therefore caused to attach to a lower wall 29, and to enter into a receiver 30 which is connected to a control line 31 of the conventionally controlled bistable fluid amplifier. A continuous high pressure jet entering into an input 32 and emanating from nozzle 33 is deflected to attach to an upper wall 34 and ejected from an outlet 35 representing the non-presence of control flow A which is to be applied to a control channel 36. Because the gentle flow applied to control channel 25 is a steady flow, it is necessary that control signal A from channel 36 be somewhat stronger than the said gentle flow from channel 25. Therefore, when the control signal is applied to channel 36, a vortex in a clockwise direction is created in the interaction chamber 26 against the flow from channel 25. The next jet pulse from nozzle 28 will therefore attach to an upper wall 37, and enter a receiver 38 which is connected to a control port 39 of the said conventional fluid amplifier. In the presence of control flow at control port 39, the continuous jet emanating from nozzle 33 will be deflected to attach to a lower wall 40 and emanate from an outlet 41. Outlet 41 thus represents the presence of a control signal in control channel 36.

It is to be noted that the flows emanating from outlets 35 and 41 are continuous flows since they stem from the continuous high pressure jet fed to input 32 of this bistable amplifier.

The power gain of the pulse operated device will be very large, since only a gentle flow is required to cause sufficient flow asymmetry so that the pulses will attach to the upper wall 37; it may be of the order of several hundred. The power gain of the continuous flow amplifier will be much smaller, that is of the order of 10 to 50, the total amplification of the combined element being the product of the two numbers.

FIG. 4b shows the monostable fluid element of FIG. 3 in combination with a conventional fluid amplifier. In a similar manner as was pointed out above in the description for FIG. 3, the jet pulses will always attach to a lower wall 42 because of the shape asymmetry of this device. If the control signal is applied to a channel 43, a vortex in a clockwise direction is established in an interaction chamber 44. This causes the jet to attach to an upper wall 45 and to enter into a receiver 46. The receivers 46 and 47 are connected to control ports 48 and 49, respectively, of a conventional bistable fluid amplifier. Fluid emanating from an outlet 50 represents the non-presence of the control flow on control channel 43, while fluid emanating from an outlet 51 represents the presence of the control flow in control channel 43.

If it is desired to use a monostable fluid amplifier, instead of the bistable fluid amplifier as described in connection with FIGS. 4a and 4b, it is necessary that a capacitor be provided between the two stages, and that those receivers of the first element into which the fluid enters when no control flow is present, be connected to an open area. The design of such an arrangement is obvious to the man skilled in the art and need not be described in more detail.

FIG. 5 shows the application of the inventive principle of arranging the control ports downstream and injecting the control flows in the backward direction, in a three-dimensional multistable fluid device. While FIG. 5 shows a tristable device, it is understood that devices with more than three stable states are also feasible.

Referring to FIG. 5, three outlet openings 52, 53 and 54 are joined together in a common interaction chamber 55. Three independent control flows can be applied to channels 56, 57 and 58 arranged in a common prismoidal body 59, and which are connected to control ports 60, 61 and 62. A cusp-shaped portion 63 on the upstream end of the prismoidal body 59, together with curved walls 64, 65 and 66 of a housing 67 of the outlet channels 52, 53 and 54 gives the interaction chamber 55 a globular shape.

For the arrangement presently being described, it is necessary that two control flows always be present simultaneously. A control flow in control channel 56 and emanating from control port 60 will be deflected by wall 64 to set up a vortex in counterclockwise direction in interaction chamber 55. A second control flow from control port 61 will also set up a vortex in interaction chamber 55 in a counterclockwise direction. The resulting direction of the two vortexes is in the direction of outlet channel 53. A pulse supplied to a jet inlet 68 and emanating from a nozzle 69 into the interaction chamber 55 will detect the vortex in the direction towards outlet channel 53, and will attach to wall 66 and emanate through output channel 53. Likewise, if control flows are applied to control channels 56 and 57, the jet pulses would tend to attach to wall 65 and emanate through outlet channel 54. In the case of control flows being present in channels 57 and 58, the jet pulses would be deflected to attach to wall 64 and emanate through outlet channel 52.

After what has been said above, it is obvious to the man skilled in the art that bleed channels can be provided between control channels 56, 57 and 58 in order to compensate the suction effects caused by the pulsed jet and to keep the pressure level in the control channels constant.

FIG. 6 shows an example of the application of the invention to a passive flip-flop circuit. The element is strictly symmetrical but for some reason the incoming jet pulse tends to attach to one or the other of the boundary walls. If it is assumed that the pulsed jet emanating from a nozzle 70 attaches to an upper wall 71 it will exit through an outlet 72. A divider 73 is so designed that part of the jet is split off and entered into a control channel 74 to charge a capacitor 75. When the pulse ceases the capacitor 75 is discharged and a control flow emanating from control channel 74 sets up a vortex in a counterclockwise direction in an interaction chamber 76.

The next pulse will detect the vortex and be deflected to attach to a lower wall 77. Part of the jet leaves the element through an outlet 78 and part of it is split off by a divider 79 to enter a control channel 80 and charge a capacitor 81. When this pulse ceases, capacitor 81 is again discharged and the direction of the vortex in interaction chamber 76 is reversed to a clockwise direction, so that the next pulse is deflected to attach to the upper wall 71 and to emanate from outlet 72, and so forth.

If the capacitors 75 and 81 are allowed to discharge within an infinitely short time, the vortex created in interaction chamber 76 may have ceased to exist before the next pulse is received. It is therefore necessary that the time constant of the device be arranged so as to be appropriate for the frequency of the input pulses. For this purpose, resistors 82 and 83 have been arranged in control channels 74 and 80.

It is obvious to the man skilled in the art that the present device operates as a passive scale-two frequency divider in that half of the pulse input frequency is obtained at each of the outlets 72 and 78.

FIGS 7a and 7b show a pulse powered fluid binary counter stage with flow asymmetry control according to the present invention. The basic principle of the binary counter is shown in FIG. 7a. The counter stage consists of a pulse powered amplifier with flow asymmetry control and an auxiliary cell consisting of a low power operated common type bistable fluid amplifier. A low pressure steady flow entering the bistable fluid amplifier through a channel 84 is assumed to be attached to an upper wall 85. It passes over a crossing 86 and exhausts through a control port 87 to establish a vortex in a clockwise direction in an interaction chamber 88. It may be mentioned in this connection that the lines crossing at 86 do not affect each other because a signal is present in only one of the lines at a time. By suitably calculated narrowing of the channel walls in the area of crossing, the opposite effects of undesired escape of fluid into the path carrying no signal, and of suction of fluid from this blank path, can be matched to compensate each other. Furthermore, a bleed line 89 is provided between the two control ports 87 and 90 in order to maintain the pressure in both control ports at the same level.

The pulse to be counted entering the device from a nozzle 91 detects the vortex in interaction chamber 88 and attaches to an upper wall 92 to exhaust through an outlet channel 93. A divider 94 is provided to split part of the main jet off and direct it into a control channel 95. The flow from control channel 95 causes the gentle steady flow in channel 84 to be switched from the upper wall 85 to a lower wall 96 of the bistable fluid amplifier. Exhausting from control port 90, this flow will set up a vortex in a counter-clockwise direction in interaction chamber 88, so that the next pulse to be counted attaches to a lower wall 97 and exhausts through an outlet channel 98. Again a divider 99 is provided to direct part of this output flow into a control channel 100, so that the gentle steady flow in channel 84 is again switched to attach to the upper wall 85 of the bistable fluid amplifier. It is to be noted that during the presence of a pulse from nozzle 91 the switching of the bistable fluid amplifier has no effect on the position of this jet pulse. That is, it is impossible to switch a jet pulse which is once attached to one or the other of walls 92 and 97, and to attach it to the opposite wall. It is only during the interval between two pulses that the vortex in the opposite direction is established in interaction chamber 88, so that the next following pulse can detect the direction of this vortex and attach to the respective wall.

A more complete binary counter stage is shown in FIG. 7b. It is composed of a pulsed amplifier with flow asymmetry control, a bistable fluid amplifier and a monostable pulse amplifier with shape asymmetry. The operation of this counter is as follows: If it is assumed that the bistable fluid amplifier is in its reset position, the jet entering through a nozzle 101 is attached to a lower wall 102; it exhausts through read-out "zero" channel 103. Part of this flow, however, is entered into a duct 104 and injected into an interaction chamber 105 to set up a vortex in a counter-clockwise direction. The pulses to be counted are supplied to a pulse counter input 106 which controls the direction of the steady power jet from a nozzle 107. Because of the shape asymmetry of this device the jet, in the absence of the pulses to be counted, is attached to a lower wall 108 and exhausts through a sink 109. During the presence of the pulse to be counted the jet is forced to attach to an upper wall 110 and to enter into interaction chamber 105, detecting there a vortex in a counter-clockwise direction, so that it then attaches to a lower wall 111 and enters a control channel 112 to control the jet from nozzle 101, which now attaches to an upper wall 113 of the bistable fluid amplifier and exhausts through an output channel 114 which is the read-out "one." Part of the flow, however, is entered into a control channel 115 to set up a vortex in a clockwise direction in interaction chamber 105. Thus, before the next pulse to be counted arrives, the flow asymmetry in interaction chamber 105 is reversed and the next pulse is deflected to exhaust through a transfer channel 116 to transfer a pulse to the next higher order stage of the counter. Every alternate pulse entering the counter is similarly transmitted by the transfer channel to the next counter stage. In addition, part of the transfer flow is entered into a control channel 117, the control flow from which serves to reset the counter to zero. There is a separate reset channel 118 by which an external reset pulse can be entered into the bistable fluid amplifier.

Another simple counter arrangement is shown in FIG. 8. The difference from the arrangements of FIGS. 7a and 7b is that no control channel is used to control what may be called the memory cell. This memory cell is formed by a simple bistable fluid amplifier in which the channels are placed slightly asymmetrically so that the jet, entering through a nozzle 120, when it is initially turned on will always select the "zero" channel 121.

If it is assumed for the purpose of this description that the flow passes through the "one" channel 122, a vortex in the direction of arrows 123 will be set up in channels 124 and 125 of a pulse device 126. When the first pulse arrives from a nozzle 127 it will then attach to walls 128 and 129 and exhaust through an outlet 130 representing the "one" position. But as the flow is exhausting through outlet 130, some of its exhausts through a sink region 131 and some, of course, interacts with the flow coming out of the "one" channel 122. This interaction means that some of the jet flow is added to the control flow from channel 122 to maintain its stability, and secondly that it will develop a very high pressure at an exit 132 of channel 122. This high pressure is transmitted backwards towards nozzle 120 and it will cause the jet from nozzle 120 to switch into the "zero" channel 121.

This is an application of what might be called load sensitivity to switch a bistable fluid amplifier. It is to be noted that the flow now in the "zero" channel 121 cannot cross the pulse jet still attached to walls 128 and 129. But when the pulse has ceased, a vortex is then created in channels 124 and 125 in a counterclockwise direction, that is, in the direction against the arrows 123, so that the next pulse received from nozzle 127 detecting this counterclockwise vortex will attach to walls 133 and 134 to exhaust through an outlet 135, representing the "zero" position of the jet. Again part of this flow is entered into a sink region 136 and another part serves to build up a high pressure at an exit 137 of the "zero" channel 121, so that the jet entering through nozzle 120 is again switched to its "one" position, that is to "one" channel 122.

FIGS. 9a and 9b show the application of the present invention to static fluid shift registers. The shift register of FIG. 9a consists mainly of three devices: a memory cell 138, an auxiliary cell 139, and a high gain amplifier 140. The memory cell 138 is a bistable symmetrical turbulent reattachment device which contains the information of the shift register. When the jet is attached to an upper wall 141 a "zero" is stored. When the jet is attached to a lower wall 142 a "one" is stored. This information can be "read out" any time at receivers 143 and 144, of which receiver 143 represents a "zero" stored and receiver 144 represents a "one" stored in this device. A small amount of this jet is entered into one of ducts 145 or 146, depending upon the position of the jet in the memory cell 138. The small flow from duct 145 or 146 is injected into auxiliary cell 139. By this flow a vortex is set up in an interaction chamber 147 of the auxiliary cell 139, which memorizes the position of the jet in the memory cell.

The auxiliary cell 139 is a passive bistable fluid amplifier with flow asymmetry control and without its own power supply. In order to understand the mode of operation of the auxiliary cell it is necessary that the mode of operation of the high gain amplifier 140 be first explained. Amplifier 140 is a monostable device in which the jet entering from a nozzle 148, when initially turned on, attaches to a wall 149 and exhausts into a sink region 150. A shift pulse can be applied to a shift input 151 in order to free the jet from wall 149 and cause it to enter into a receiver 152 of auxiliary cell 139. Every time the shift pulse in shift input 151 ceases, the jet is free to reattach to wall 149 and exhaust through sink region 150. Therefore, the auxiliary cell 139 operates in a kind of pulse mode of operation.

The pulses received by receiver 152 and entering the auxiliary cell through a nozzle 153 will detect the flow asymmetry which was previously set up in interaction chamber 147.

It may be assumed that a "zero" is stored in the memory cell by applying a flow to a write-in "zero" channel 154. This causes the continuous jet from a nozzle 155 to attach to the upper wall 141 and to enter partly into read "zero" receiver 143 and duct 145. The flow from duct 145 will establish a vortex in a clockwise direction, so that the pulsed jet arriving from high gain amplifier 140 through nozzle 153 will attach to a lower wall 156 and enter into a shift "zero" receiver 157. This shift signal is transferred to the next stage of the register. The shifting action cannot be disturbed by new information which is fed into the memory cell 138 from the preceding stage. Even a change in direction of the flow asymmetry control vortex in the auxiliary cell does not affect the position of the jet pulse attached to a side wall, but it does control the next jet pulse entering the auxiliary cell from high gain amplifier 140.

Likewise, if a "one" is stored in memory cell 138 by applying a control flow to a write-in "one" channel 158, the jet from nozzle 155 is forced to attach to wall 142 and to enter into read-out "one" receiver 144 and partly into duct 146, thus setting up a vortex in counterclockwise direction in interaction chamber 147 of auxiliary cell 139. A jet pulse entering the auxiliary cell from nozzle 153 will thus attach to an upper wall 159 and enter into a shift "one" receiver 160. It is to be noted that shift "zero" receiver 157 and shift "one" receiver 160 only receive a signal when a shift pulse is applied to shift input 151, since only then does the jet from nozzle 148 set off from wall 149 to enter into receiver 152; and that when this shift pulse ceases the jet will reattach to wall 149 and exhaust through sink region 150.

Any time there is a shift signal at either of the receivers 157 or 160, it is transmitted to the next stage and entered into those control channels which correspond to control channels 161 and 162 of the stage shown.

A complete shift register comprises a number of stages like the one shown in FIG. 9a. The shift pulse is applied simultaneously to each of the individual stages, so that the information contained for instance in the first stage is shifted to the second, while the information present in the second stage is being shifted to the third, and so forth. As information is shifted out of auxiliary cell 139, new information is entered into memory cell 138. The auxiliary cell acts as temporary storage, because it remembers the previous information during the presence of a shift pulse in that the flow asymmetry is not altered during the presence of that shift pulse. The flow asymmetry can be altered only when the shift pulse has ceased, and the information is then shifted out to the next stage. This arrangement is particularly advantageous since it makes the use of delay lines between the individual stages of the shift register unnecessary. In the shift registers of the prior art it was always necessary to first free one stage of the information which was stored therein before new information could be entered, and this was done by providing delay lines between the individual stages of the shift register. In the device presently being described, this disadvantage is overcome in that auxiliary cell 139 acts as temporary storage for the old information so that the entrance of new information and the shift-out of old information can be achieved simultaneously.

The fluid shift register shown in FIG. 9a can also be operated with a bistable asymmetric pulsed amplifier in place of the high gain amplifier 140. The bistable asymmetric pulsed amplifier 163 of FIG. 9b is connected with its outlet 164 to nozzle 153 of the auxiliary cell 139 shown in FIG. 9a. If no shift pulse is present on shift input 165 the jet from a nozzle 166 attaches to an upper wall 167 and exhausts into a sink region 168. The nozzle 166 is fed from the power source with a continuous series of pulses. When a shift pulse is applied to shift input 165 the device is preset, so that when the next power pulse comes the jet will attach itself to a wall 169 and exhaust through outlet 164 to energize nozzle 153 of the auxiliary cell 139 (FIG. 9a) and enter into one of the receivers 157 and 160, depending on the direction of the vortex in interaction chamber 147. When the jet is attached to wall 169 it will also energize a receiver 170, from where the flow is fed back to a channel 171 as to deflect the shift pulse and direct it into a receiver 172 which in turn feeds it back to a receiver 173 to keep the shift pulse deflected until it ceases. When the next power pulse enters nozzle 166 it will go along upper wall 167 because there is no longer a control jet which presets the device. This means that for each shift pulse in shift input 165 there is only one pulse along wall 169.

This arrangement has the advantage that it uses the interaction of three jets which can be used at an extremely small Reynolds number which means that the control power necessary for the shift pulse in shift input 165 is much smaller than when a wall attachment control device was used. It is to be noted that there is no synchronism between the shift pulse on input 165 and the power pulse supplied to nozzle 166.

While the invention has been particularly shown and described with reference to preferred embodiments thereof it will be understood by those skilled in the art that various changes in form and details may be made therein without departing from the spirit and scope of the invention.

What is claimed is:

1. A fluid jet amplifier comprising:
   (a) an orifice adapted to issue a fluid jetstream intermittently;
   (b) a chamber connected to said orifice having sidewalls diverging away from said orifice and a concavely shaped endwall facing said orifice;
   (c) a pair of fluid discharge ducts adjoining said sidewalls and operative to receive said jetstream when it is deflected to an off-axis position, one of said ducts having a larger flow area than the other so as to provide preferential flow thereinto;
   (d) a fluid control duct operative to induce a vortex flow of fluid in said chamber when said jetstream is not flowing whereby when upon resumption of flow of said jetstream the jetstream will be deflected to flow into the discharge duct having the lesser flow area; and
   (e) means responsive to the flow of fluid into said duct having the lesser area for preserving the vortex flow in said chamber to thereby maintain stable flow into the duct.

2. A fluid jet amplifier having three stable operating states comprising:
   (a) an orifice adapted to intermittently issue a fluid jetstream;
   (b) a chamber having a generally triangular cross-sectional shape connected to said orifice, a concavely shaped endwall facing said orifice and sidewalls diverging away from said orifice;
   (c) three fluid discharge ducts each formed by two adjacent sidewalls and an insert fitted to said sidewalls to define the three discharge ducts and the chamber, said insert having the concave endwall formed therein;
   (d) three control ducts formed in said insert and opening into said discharge ducts adjacent to said chamber and operative to selectively issue fluid in a direction contra to the flow of fluid from said orifice to establish a vortex flow of fluid in said chamber by combinations of flows in two out of three of said control ducts to cause said jetstream to be selectively deflected to a desired one of the three discharge ducts.

3. A fluid flip-flop operative as a scale-of-two counter comprising:
   (a) an orifice adapted to intermittently issue a fluid jetstream;
   (b) a chamber connected to said orifice and having generally diverging sidewalls and a concave endwall facing said orifice;
   (c) a pair of fluid discharge ducts symmetrically disposed with respect to said orifice and joining with said sidewalls;
   (d) a pair of control ducts disposed off-axis in opposition to said orifice;
   (e) resilient flow inhibiting means interconnecting said control ducts;
   (f) flow restrictors in said control ducts, whereby upon each successive resumption of flow of said jetstream it will be diverted to flow to the other one of said discharge ducts.

4. A fluid jet amplifier comprising:
   (a) an orifice adapted to issue a fluid jetstream in intermittent succession;
   (b) a chamber connected to said orifice having sidewalls diverging away from said orifice and a concavely shaped endwall facing said orifice;
   (c) a pair of fluid discharge ducts adjoining said sidewalls and operative to receive said jetstream when it is deflected to an off-axis position;
   (d) fluid control ducts operative to induce a vortex flow of fluid in said chamber when said jetstream is not flowing and inoperative to affect the position of said jetstream after it has been flowing, the said ducts being disposed off-axis facing said orifice and between said discharge ducts and interconnected to maintain the same ambient pressure but operative to selectively induce an off-axis flow in opposition to the flow of said jetstream to produce vortex rotational flow of selective direction of rotation, whereby upon resumption of flow of said jetstream the jetstream will be deflected off-axis into one of said discharge ducts as a function of the direction of rotation of said vortex flow; and
   (e) means responsive to the off-axis flow of said jetstream for preserving the vortex flow in said chamber.

References Cited

UNITED STATES PATENTS

| | | | |
|---|---|---|---|
| 3,159,168 | 12/1964 | Reader | 137—81.5 |
| 3,193,197 | 7/1965 | Bauer | 137—81.5 X |
| 3,201,041 | 8/1965 | Welsh | 137—81.5 X |
| 3,229,705 | 1/1966 | Norwood | 137—81.5 |
| 3,247,860 | 4/1966 | Zilberfarb | 137—81.5 |
| 3,247,861 | 4/1966 | Bauer | 137—81.5 |
| 3,270,758 | 9/1966 | Bauer | 137—81.5 |
| 3,275,016 | 9/1966 | Wood | 137—81.5 |

M. CARY NELSON, *Primary Examiner.*

S. SCOTT, *Assistant Examiner.*